United States Patent
Chauvin et al.

(10) Patent No.: US 6,982,050 B2
(45) Date of Patent: Jan. 3, 2006

(54) RUBBER COMPOSITION WHICH IS FREE OF CARCINOGENIC NITROSAMINE PRECURSOR AND SERVES AS CONNECTING RUBBER

(75) Inventors: Brigitte Chauvin, Chamalieres (FR); Jean-Luc Mangeret, Riom (FR)

(73) Assignee: Michelin Recherche et Technique, S.A., Granges-Paccot (FR)

( * ) Notice: Subject to any disclaimer, the term of this patent is extended or adjusted under 35 U.S.C. 154(b) by 0 days.

(21) Appl. No.: 10/103,212

(22) Filed: Mar. 21, 2002

(65) Prior Publication Data

US 2002/0180078 A1 Dec. 5, 2002

Related U.S. Application Data

(62) Division of application No. 08/505,131, filed on Jul. 21, 1995, now abandoned.

(30) Foreign Application Priority Data

Aug. 3, 1994 (FR) ............................................. 94 09740

(51) Int. Cl.
*B29C 35/00* (2006.01)

(52) U.S. Cl. .................... 264/36.14; 264/326

(58) Field of Classification Search ................. 264/326, 264/315, 236, 349, 36.14; 425/17
See application file for complete search history.

(56) References Cited

U.S. PATENT DOCUMENTS 4,861,842 A    8/1989   Cohen

FOREIGN PATENT DOCUMENTS

EP              545883      *  6/1993

* cited by examiner

*Primary Examiner*—Mathieu D. Vargot
(74) *Attorney, Agent, or Firm*—Felipe J. Farley; Christopher P. Crecente; Alan A. Csontos

(57) ABSTRACT

A rubber composition which is free of precursor of at least one carcinogenic nitrosamine, is capable of vulcanization at a temperature of between 95° C. and 140° C., and has a vulcanization system which includes:
   a) sulfur;
   b) an accelerator compound;
   c) an ultra-accelerator compound;
   d) a vulcanization amine activator.

A process for vulcanizing this composition in the manufacture of a new tire or in the repair and/or recapping of a worn tire.

14 Claims, No Drawings

RUBBER COMPOSITION WHICH IS FREE OF CARCINOGENIC NITROSAMINE PRECURSOR AND SERVES AS CONNECTING RUBBER

This application is a divisional of U.S. patent application Ser. No. 08/505,131, filed Jul. 21, 1995, now abandoned, which claims priority to French application FR94/09740, filed Aug. 3, 1994.

BACKGROUND OF THE INVENTION

The present invention relates to a composition comprising at least one rubber, said composition being intended, in particular, to serve as connecting rubber for the manufacture of a new tire, or as connecting rubber or repair rubber for the recapping or repair of a worn tire.

The invention also concerns a process which consists in vulcanizing said composition, for instance in order to assure the connection between two rubber parts, in particular upon the manufacture, recapping or repair of a tire.

Two main recapping processes are known, namely:

the first process, known as "mold recapping" or "hot recapping", consists in placing a new raw tread, free of tread pattern, on the used carcass after it has been decapped and brushed, and curing the tire assembly thus formed in a mold, under pressure, at temperatures of about 150° C.; the tread pattern is imparted upon this operation by the action of the hot mold under pressure;

the second process is based on the concept of "cold vulcanization", that is to say vulcanization at a relatively low temperature of between 95 and 140° C. and, in particular, between 95 and 115° C.

This second cold vulcanization process is described, for instance, in U.S. Pat. Nos. 3,951,720, 2,976,910, 3,136,673, and 3,236,709, and in "Tire Technology International 1993" (The Annual Review of Tire Materials and Tire Manufacturing Technology, UK & International Press, 1993, p. 194).

In this process, a raw layer of a rubber preparation is interposed between the decapped tire and the precured replacement tread, this layer being intended to assure the connection of the materials after curing at low temperature. Such rubber preparations are thus commonly referred to in the art as "connecting rubbers". As the carcass and the replacement tread are already vulcanized, the recuring temperature upon the recapping should be as low as possible in order not to impair the performance of the tire, as mentioned in the reference "La chaleur raccourcit la vie du pneumatique" [Heat shortens the life of tires] (Bandag, Communication Pneu, 1992, p. 32).

In this cold vulcanization process, good adherence of the connecting rubber to the precured adjacent mixes requires a high degree of vulcanization. The high coherence necessary for the connecting rubber is acquired by the cross-linking upon the low temperature curing. For these connecting rubbers it is therefore necessary to use vulcanization systems which are very reactive at low temperature so as to assure fast curing speeds and high degrees of cross-linking. These two performances of the vulcanization system are indispensable in order to improve the productivity and quality of this type of recapping.

However, it is also indispensable that these vulcanization systems do not result in early vulcanization in the normal conservation conditions of the connecting rubbers at the temperatures at which they are normally stored or transported. Vulcanization systems which are very reactive on curing are frequently unstable in raw state. A solution known in the art for reconciling the requirements of reactivity and of stability of these vulcanization systems consists in keeping the vulcanization agent, on the one hand, and the vulcanization accelerators, on the other hand, separate during storage and in permitting them to come into contact with each other only during the recapping operation. Thus, for example, U.S. Pat. No. 2,976,910 discloses the joint use of a solution containing either the cross-linking agent or the vulcanization accelerators and of a film which contains the missing ingredients of the vulcanization system. It is also possible, as disclosed in U.S. Pat. No. 3,136,673, to use two films, one containing the cross-linking agent and the other the vulcanization accelerators.

On the other hand, new constraints of a toxicological nature have appeared in recent years based on the strict European regulations which limit the amount of certain nitrosamines in the storage areas and curing shops to very low values.

In Germany, for instance, there exists the "Technical Rule for Dangerous Substances", TRGS No. 552, which is devoted specifically to nitrosamines and establishes maximum concentrations for the latter in the air.

TRGS No. 552 is cited in several technical articles which point out the carcinogenic effect of nitrosamines and propose possible substitutes for the products which are precursors of carcinogenic nitrosamines:

"A new safe thiuram, TBzTD" (D. B. Seeberger, 136th Meeting of the Rubber Division, ACS Paper No. 70, 1989).

"Les nitrosamines: un défi bien réel" [Nitrosamines: A real challenge] (H. W. Engels, Caoutchoucs & Plastiques, No. 715, pages 52 to 57, 1992).

"Les nitrosamines dans l'industrie du caoutchouc: le point sur la question en République Fédérale d'Allemagne" [Nitrosamines in the rubber industry: The focus on the matter in the Federal Republic of Germany] (P. Lupfert, Kautschuk Gummi, Kunststoffe, Vol 42, No. 1, pages 16 to 21, 1989).

"N-nitrosamines volatiles et atmosphères industrielles" [Volatile N-nitrosamines and industrial atmospheres] (N. Daubourg, A. Coupard and A. Pepe, Caoutchoucs et Plastiques, No. 717, pages 103 to 11, October, 1992).

In the tire industry, vulcanization accelerators are very frequently precursors of nitrosamines; now, there are primarily twelve nitrosamines which are classified as carcinogenic and are cited in TRGS No. 55, such as N-nitrosomorpholine, N,N-dimethylnitrosamine, N,N-diethylnitrosamine, and these nitrosamines are for the most part capable of being produced by nitrosation of the decomposition products of the vulcanization accelerators.

In this context of industrial hygiene, it is therefore important that the systems for the vulcanization of rubber compositions in general and the connecting rubbers in particular be without carcinogenic nitrosamine precursors which are covered by the regulations.

The rubber compositions which are intended in particular for use as connecting rubbers and which contain complete vulcanization systems, that is to say both vulcanization agents and vulcanization accelerators, must therefore at the same time present rapid curings at low temperature with high yields, excellent raw stability under the ordinary conditions of preservation, storage and transportation, and be free of any compound or ingredient which is a precursor of carcinogenic nitrosamines covered by the regulations.

In the literature, complete sulfur vulcanization systems for low-temperature curing are widely cited.

It is thus known that combinations formed of ultra-accelerators of the thiuram or dithiocarbamate family and derivatives of benzothiazole confer a high reactivity at low temperature on the mixes, as cited in:

"Room Temperature Curative Systems for Natural Rubber" (S. W. SIN, Proceedings of Technology Seminar, Dec. 4–5, 1978, pages 178 to 186).

"Vulcanization and Vulcanizing agents" (W. Hofmann, Palmerton Publishing, New York, 1967, page 139).

Encyclopedia of Chemical Technology, 3rd edition (Vol 20, published by John Wiley & Sons, Inc., 1982, pages 350 to 352).

Moreover, it is also known that such combinations may make it possible to obtain high vulcanization yields as cited by T. D. Skinner and A. A. Watson (Rubber Age 99 (11), p. 76, 1967).

Nevertheless, the high reactivity of these products upon the curing of the compositions which contain them generally produces a marked tendency to prevulcanization and scorching at moderate temperatures which may correspond to the temperatures of preservation or storage of these compositions, as cited in "Prevulcanization inhibitor of sulfur-free thiuram vulcanization" (V. Duchacek, Rubber Chem. & Technol., 46, pages 504 to 510, 1973).

Furthermore, many thiurams and dithiocarbamates which make it possible to effect low-temperature curing are precursors of carcinogenic nitrosamines in accordance with European law such as, for instance, methyl zimate (zinc dimethyldithiocarbamate) cited in U.S. Pat. No. 3,951,720, this product being a precursor of dimethylnitrosamine which is classified as carcinogenic in Regulation TRGS 552.

Moreover, complete vulcanization systems conferring good resistance to scorching and excellent raw stability on raw rubber compositions are also known. Examples of such systems are cited in:

Encyclopedia of Chemical Technology (3rd edition, Vol. 20, published by John Wiley & Sons, Inc., 1982, pages 390 to 392).

OTOS/MBT Derivative Vulcanization Systems" (K. C. Moore, Elastomerics, 110 (6), 1978, pages 36 to 42).

However, the modest reactivity of these known systems results in slow curing at low temperature.

Thus, in the present state of the art, there is no complete vulcanization system which is a non-precursor of nitrosamines which are carcinogenic and therefore regulated, which is capable of conferring in rubber preparations, and in particular in rubber compositions for connecting rubbers, at the same time:

rapid curing at low temperature,
a high cross-linking yield after curing at low temperature,
good stability to storage at moderate temperature (20–40° C.).

SUMMARY OF THE INVENTION

The object of the present invention is to propose a composition and a process which make it possible simultaneously to obtain the combination of the aforementioned advantages with the use of non-toxic compounds.

Therefore, the composition in accordance with the invention, which is without precursor of at least one carcinogenic nitrosamine and which comprises at least one rubber selected from the group consisting of natural rubber, polyisoprene, polybutadiene, styrene-butadiene copolymers, styrene-isoprene copolymers, butadiene-isoprene copolymers and styrene-butadiene-isoprene terpolymers, and capable of vulcanization at a temperature of between 95° C. and 140° C., is characterized by the fact that it comprises as the vulcanization system:

a) sulfur;

b) at least one accelerator compound selected from the group consisting of benzothiazyl disulfide and mercaptobenzothiazole;

c) at least one ultra-accelerator compound selected from the group consisting of tetrabenzylthiuram disulfide and zinc dibenzyldithiocarbamate;

d) at least one vulcanization amine activator selected from the group formed of amines, guanidines, aldehyde and amine condensates, and quaternary ammonium salts.

The process in accordance with the invention consists in vulcanizing the said composition at a temperature of between 95° C. and 140° C., this process being used, for instance, in order to bond two pieces of rubber, particularly upon the manufacture, recapping, or repair of tires.

The composition in accordance with the invention may furthermore comprise the customary fillers and additives such as, for instance, carbon black, silica, silicic acid, zinc oxide, stearic acid, cobalt salts, resins, protective agents, in particular antioxidants, extender oils, tackiness agents and various processing agents.

The invention will be easily understood on basis of the non-limitative examples given below.

DESCRIPTION OF PREFERRED EMBODIMENTS

I. Formulas and Abbreviations

The meaning of the abbreviations used in the following specification is indicated below, together with the corresponding chemical formulas.

MBT: mercaptobenzothiazole

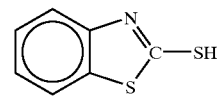

MBTS: benzothiazyl disulfide

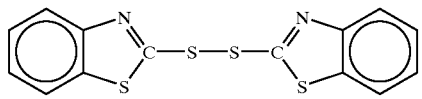

ZBEC: zinc dibenzyldithiocarbamate

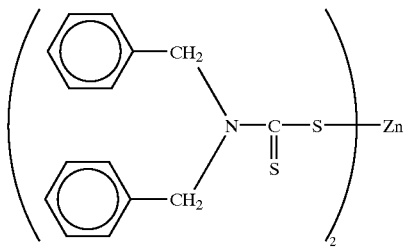

TBZTD: tetrabenzylthiuram disulfide

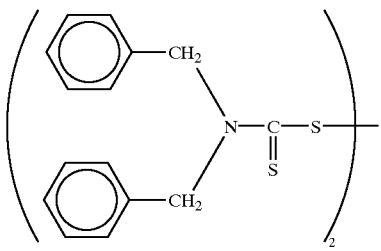

TMTD: tetramethylthiuram disulfide

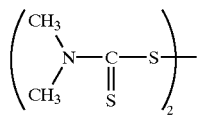

DPG: diphenylguanidine

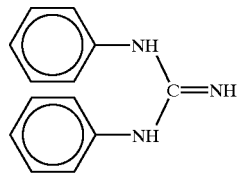

BA Condensate: butyraldehyde-aniline condensate

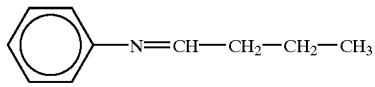

CHA: cyclohexylamine

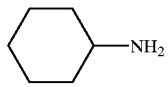

Aliquat 336®: methyl trioctyl-ammonium chloride (HENKEL Corp.)

II. Definitions and Tests

The definitions and tests used in the examples are indicated below.

1. Rheometry

A conventional oscillating rotor rheometer is used such as described in AFNOR Standard NF-T43-015 (August 1975). The measurements are made at 110° C.

The change of the rheometric torque as a function of time describes the development of the stiffening of the rubber composition as a result of the cross-linking of the latter by the sulfur under the action of the heat. The maximum rheometric torque permits a description of the yield of this cross-linking reaction.

The kinetic characteristics of the curing of the compositions are evaluated in accordance with said Standard by the following parameters:

ts(0.2): induction time of the reaction t99: curing time for reaching a degree of advance of the cross-linking of 0.99, with the following relationship:

$$\frac{\text{(rheometric torque at } t99)}{\text{(maximum rheometric torque)}} = 0.99$$

CRI: cross-linking rate index, with the following relationship:

$CRI = 100/[t99 - ts(0.2)]$

2. Mooney Plasticity

The measurement of the Mooney plasticity is effected in an oscillating consistometer in accordance with the principle described in AFNOR Standard NF-T 43-005 (November 1980), indicated below.

The raw composition is molded in a cylindrical enclosure heated to 100° C. After preheating for one minute, the rotor turns within the test specimen at 2 rpm and the torque useful for maintaining this movement after 4 minutes of rotation is measured.

The Mooney plasticity is noted as ML(1+4). It is expressed in "Mooney units" (M.U.):

1 M.U.=0.083 newton.meter (N.m).

The Mooney plasticity makes it possible to note the change in time of the stability of a raw rubber composition (raw stability). For this purpose, for a given composition, the Mooney plasticity ML(1+4) is determined on the initial composition and on the composition which has undergone aging by storage at 40° C. for 21 days.

This change is then given by the Mooney delta which is defined by the relationship:

Mooney delta=ML(1+4) after storage−initial ML(1+4)

III. EXAMPLES

In the examples which follow, the compositions are either compositions in accordance with the invention or compositions not in accordance with the invention. In the compositions of these examples the values which correspond to components are parts by weight, unless otherwise indicated.

Example 1

The purpose of this example is to show the good compromise between reactivity and stability of the compositions in accordance with the invention.

A basic mixture is prepared having the following composition:

| | |
|---|---|
| Natural rubber: | 100 |
| Carbon black: | 47 |
| Oil: | 15 |
| Zinc oxide: | 5 |
| Stearic acid: | 1 |
| Antioxidant:* | 2 |

To this base mixture there are added insoluble sulfur, accelerators, and activators in accordance with Table 1. The insoluble sulfur used is CRYSTEX® $^T$20 sulfur of Kali-Chemie, Stauffer GmbH, which contains 20% by weight of naphthenic oil.

One thus obtains five compositions indicated as 1.1 to 1.5.

TABLE 1

| Composition | 1.1 | 1.2 | 1.3 | 1.4 | 1.5 |
|---|---|---|---|---|---|
| MBTS | 1.1 | | | 0.32 | 1.1 |
| MBT | | 0.6 | 0.6 | | |
| ZDEC | | 0.5 | | | |
| TMTD | 0.22 | | | | |
| TBZTD | | | | | 0.5 |
| ZBEC | | | 1.35 | 1.44 | |
| DPG | 0.44 | 0.11 | | 0.33 | |
| BA condensate | | | | | 0.3 |
| Insol. sulfur | 2.75 | 3 | 3 | 3 | 2.75 |

Composition 1.1 contains TMTD, precursor of dimethylnitrosamine, which is carcinogenic and therefore regulated; it is not in accordance with the invention.

Composition 1.2 contains ZDEC, a precursor of diethylnitrosamine, which is carcinogenic and therefore regulated; it is not in accordance with the invention.

Composition 1.3 contains no amine vulcanization activator; it is not in accordance with the invention.

Compositions 1.4 and 1.5 are formulated with combinations of accelerators and an amine vulcanization activator (MBTS/ZBEC/DPG or MBTS/TBZTD/BA condensate); they are in accordance with the invention.

The rheometric characteristics of 1.1 to 1.5 at 110° C. are given in Table 2.

TABLE 2

| Composition | 1.1 | 1.2 | 1.3 | 1.4 | 1.5 |
|---|---|---|---|---|---|
| ts (0.2) (min) | 8.7 | 3.5 | 1.2 | 6.2 | 2.9 |
| t99 (min) | 35 | 31 | 78 | 28 | 24 |
| CRI (min$^{-1}$) | 3.8 | 3.64 | 1.3 | 4.59 | 4.74 |
| Maximum rheometric torque (dN.m) | 16.2 | 13.9 | 12.7 | 14.7 | 14.9 |

Compositions 1.1, 1.2, 1.4 and 1.5 make it possible to obtain rapid curings at 110° C. with a high vulcanization yield.

Composition 1.3 cures very slowly and reaches a much lower vulcanization yield.

It is noted that, as compared with system 1.1 or 1.2, the use of the combinations MBTS/ZBEC/DPG or MBTS/TBZTD/BA condensate leads to a decrease in the curing time (t99) and to an increase in the rate (CRI).

The compositions 1.4 and 1.5 in accordance with the invention therefore permit faster curings than the known compositions (compositions 1.1, 1.2, and 1.3).

As indicated previously in section 2 of Chapter II, the stability of the raw rubber compositions is determined by the development of the Mooney plasticity (Mooney delta) after aging effected by storage at 40° C. for a period of 21 days.

The results are regrouped in Table 3.

TABLE 3

| Composition | 1.1 | 1.2 | 1.3 | 1.4 | 1.5 |
|---|---|---|---|---|---|
| ML (1 + 4) init. | 40.3 | 48.5 | 48 | 45 | 42.5 |
| ML (1 + 4) after storage | 53.5 | 80 | 52.8 | 49.3 | 49 |
| Mooney delta | 13.2 | 32 | 4.8 | 4.3 | 6.5 |

The development of the plasticity (Mooney delta) of compositions 1.1 and 1.2 which are not in accordance with the invention is very substantial, particularly in the case of composition 1.2.

The raw stability is very definitely improved with compositions 1.4 and 1.5 in accordance with the invention.

The stability of composition 1.3 which is not accordance with the invention is also very good. Nevertheless, as stated previously in connection with Table 2, the vulcanization system of this composition is not sufficiently reactive to confer rapid curing kinetics at 110° C. on the composition.

Example 2

This example makes it possible to show the influence of the relative contents of compounds b) and c) of the invention, compound b) being MBTS and compound c) being TBZTD or ZBEC.

To the base mixture of Example 1 insoluble sulfur, accelerators and activators are added in accordance with Table 4. The insoluble sulfur used is that described in Example 1.

In this way six compositions are obtained, 2.1 to 2.6.

TABLE 4

| Composition | 2.1 | 2.2 | 2.3 | 2.4 | 2.5 | 2.6 |
|---|---|---|---|---|---|---|
| MBTS | | 0.32 | 1.1 | 0.6 | 1.1 | 0.32 |
| MBT | 0.6 | | | | | |
| ZDEC | 0.5 | | | | | |
| TBZTD | | | | | 0.5 | 1.28 |
| ZBEC | | 1.44 | 0.56 | 0.5 | | |
| DPG | 0.11 | 0.33 | 0.33 | 0.33 | | |
| BA condensate | | | | | 0.3 | 0.3 |
| Insol. sulfur | 3 | 3 | 3 | 3 | 2.75 | 2.75 |

Composition 2.1 contains ZDEC, precursor of diethylnitrosamine, which is carcinogenic and therefore regulated; it is not in accordance with the invention.

Compositions 2.2 to 2.6 in accordance with the invention are formulated with combinations MBTS/ZBEC/DPG or MBTS/TBZTD/BA condensate; modifying for each of these combinations the quantities of MBTS and of ZBEC or TBZTD.

The rheometric characteristics at 110° C. of these compositions are given in Table 5.

TABLE 5

| Composition | 2.1 | 2.2 | 2.3 | 2.4 | 2.5 | 2.6 |
|---|---|---|---|---|---|---|
| ts (0.2) (min) | 3.5 | 6.2 | 11.6 | 15 | 2.9 | 8.5 |
| t99 (min) | 31 | 28 | 39.2 | 44.8 | 24 | 25.5 |
| CRI (min$^{-1}$) | 3.64 | 4.59 | 3.62 | 3.35 | 4.74 | 5.88 |
| Maximum rheometric torque (dN.m) | 13.9 | 14.7 | 16.6 | 15.1 | 14.5 | 14.2 |

Compositions 2.1 to 2.6 make it possible to obtain rapid curings at 110° C. with a high yield.

The combinations MBTS/ZBEC/DPG or MBTS/TBZTD/BA condensate, whatever the amounts of accelerators employed, make it possible to have curing rates (CRI) similar to that of the normal composition (composition 2.1), or even faster.

The change in the Mooney plasticity at 100° C. of compositions 2.1 to 2.6 is given in Table 6.

TABLE 6

| Composition | 2.1 | 2.2 | 2.3 | 2.4 | 2.5 | 2.6 |
|---|---|---|---|---|---|---|
| ML (1 + 4) init. | 48 | 45 | 42 | 42 | 42.5 | 38 |
| ML (1 + 4) after storage | 80 | 49.3 | 46 | 45.1 | 49 | 47 |
| Mooney delta | 32 | 4.3 | 4 | 3.1 | 6.5 | 9 |

The development of the plasticity of composition 2.1 which is not in accordance with the invention is very substantial.

The raw stability of compositions 2.2 to 2.6 in accordance with the invention is definitely better than that of composition 2.1.

Example 3

This example makes it possible to show the influence of the selection of the compound b) (MBT or MBTS) when the compound c) is fixed (ZBEC).

To the base mixture of Example 1 there are added insoluble sulfur, accelerators, and activators in accordance with Table 7. The insoluble sulfur used is that described in Example 1.

There are thus obtained four compositions in accordance with the invention, marked 3.1 to 3.4, which are formulated from a combination employing a sulfur derivative of benzothiazole (MBT or MBTS) as compound b), ZBEC as compound c), and DPG as compound d).

TABLE 7

| Composition | 3.1 | 3.2 | 3.3 | 3.4 |
|---|---|---|---|---|
| MBT | 0.32 | | 0.6 | |
| MBTS | | 0.32 | | 0.6 |
| ZBEC | 1.44 | 1.44 | 0.5 | 0.5 |
| DPG | 0.22 | 0.33 | 0.15 | 0.33 |
| Insoluble sulfur | 3 | 3 | 3 | 3 |

The rheometric characteristics of these four compositions measured at 110° C. are given in Table 8.

TABLE 8

| Composition | 3.1 | 3.2 | 3.3 | 3.4 |
|---|---|---|---|---|
| ts (0.2) (min) | 4.5 | 6.2 | 5.8 | 15 |
| t99 (min) | 26 | 28 | 34 | 44.8 |
| CRI (min$^{-1}$) | 4.65 | 4.59 | 3.54 | 3.35 |
| Maximum rheometric torque (dN · m) | 14.3 | 14.7 | 14.3 | 15.0 |

Compositions 3.1 to 3.4, which are in accordance with the invention, make it possible to obtain rapid curing kinetics at 110° C. with, in parallel to this, a high vulcanization yield.

Table 9 shows the development of the Mooney plasticity at 100° C.

TABLE 9

| Composition | 3.1 | 3.2 | 3.3 | 3.4 |
|---|---|---|---|---|
| ML (1 + 4) init. | 42 | 45 | 42 | 42 |
| ML (1 + 4) after storage | 45.1 | 49.3 | 46 | 45.1 |
| Mooney delta | 3.1 | 4.3 | 4 | 3.1 |

In all cases, the raw stability of the compositions is excellent.

Example 4

The purpose of this example is to show the influence of the selection of the compound d), amine vulcanization activator.

To the base mixture of Example 1 there are added an insoluble sulfur, accelerators, and activators in accordance with Table 10. The insoluble sulfur used is that described in Example 1.

In this way there are obtained four compositions in accordance with the invention, marked 4.1 to 4.4, which are formulated on the basis of a MBTS/ZBEC combination with an amine activator of different chemical nature—amine, guanidine, aldehyde-amine condensate, quaternary ammonium salt.

TABLE 10

| Composition | 4.1 | 4.2 | 4.3 | 4.4 |
|---|---|---|---|---|
| MBTS | 0.32 | 0.32 | 0.32 | 0.32 |
| ZBEC | 1.44 | 1.44 | 1.44 | 1.44 |
| DPG | 0.33 | | | |
| BA condensate | | 0.15 | | |
| Aliquat ® 336 | | | | 0.15 |
| Cyclohexylamine | | | 0.3 | |
| Insoluble sulfur | 3 | 3 | 3 | 3 |

The rheometric characteristics of these compositions measured at 110° C. are given in Table 11.

TABLE 11

| Composition | 4.1 | 4.2 | 4.3 | 4.4 |
|---|---|---|---|---|
| ts (0.2) (min) | 6.2 | 2.6 | 4.7 | 2.7 |
| t99 (min) | 28 | 24.6 | 32.7 | 18.6 |
| CRI (min$^{-1}$) | 4.59 | 4.54 | 3.57 | 6.29 |
| Maximum rheometric torque (dN · m) | 14.7 | 14.1 | 14.9 | 13.8 |

Whatever the amine vulcanization activator used, the MBTS/ZBEC systems confer upon the compositions rapid curing kinetics at 110° C. with a high vulcanization yield.

Table 12 shows the development of the Mooney plasticity at 100° C.

TABLE 12

| Composition | 4.1 | 4.2 | 4.3 | 4.4 |
|---|---|---|---|---|
| ML (1 + 4) init. | 45 | 43.5 | 38 | 36.5 |
| ML (1 + 4) after storage | 49.3 | 48.5 | 44 | 40.2 |
| Mooney delta | 4.3 | 5 | 6 | 3.7 |

Regardless of the nature of the compound d) selected, compositions 4.1 to 4.4 in accordance with the invention show very good raw stability.

Example 5

In this example, compositions having different amounts of carbon black and oil as compared with the previous examples are studied.

A base mixture is prepared having the following composition:

| | |
|---|---|
| Natural rubber: | 100 |
| Carbon black: | 30 |
| Oil: | 23 |
| Zinc oxide: | 5 |
| Stearic acid: | 1 |
| Antioxidant:* | 2 |

To this base mixture there are added insoluble sulfur, accelerators and activators in accordance with Table 13. The insoluble sulfur used is that described in Example 1.

There are thus obtained four compositions, 5.1 to 5.4.

TABLE 13

| Composition | 5.1 | 5.2 | 5.3 | 5.4 |
|---|---|---|---|---|
| MBT | 0.6 | 0.6 | 0.6 | |
| MBTS | | | | 0.32 |
| ZDEC | 0.5 | | | |
| ZBEC | | 1.35 | 0.5 | 1.44 |
| DPG | 0.22 | | 0.22 | 0.33 |
| Insoluble sulfur | 3.5 | 3.5 | 3.5 | 3.5 |

Composition 5.1 contains ZDEC, diethylnitrosamine precursor, which is carcinogenic and therefore regulated; it is not in accordance with the invention.

Composition 5.2 contains no amine vulcanization activator d); it is not in accordance with the invention.

Compositions 5.3 and 5.4 are formulated with combination of accelerators and a vulcanization activator (MBT/ZBEC/DPG or MBTS/ZBEC/DPG); they are in accordance with the invention.

Table 14 shows the rheometric characteristics at 110° C. of these compositions.

TABLE 14

| Composition | 5.1 | 5.2 | 5.3 | 5.4 |
|---|---|---|---|---|
| ts (0.2) (min) | 2.3 | 2.5 | 0.7 | 4.8 |
| t99 (min) | 24.6 | 46 | 27.5 | 21 |
| CR1 (min$^{-1}$) | 4.48 | 2.3 | 3.73 | 6.17 |
| Maximum rheometric torque (dN · m) | 9.3 | 8.6 | 8.5 | 8.5 |

Composition 5.2 cures very slowly.

Compositions 5.1, 5.3 and 5.4 make it possible to obtain rapid curings at 110° C. and a high vulcanization rate.

Table 15 shows the development of the Mooney plasticity at 100° C.

TABLE 15

| Composition | 5.1 | 5.2 | 5.3 | 5.4 |
|---|---|---|---|---|
| ML(1 + 4) init. | 27 | 24.3 | 252 | 25 |
| ML(1 + 4) after storage | 64 | 25.5 | 28 | 27 |
| Mooney delta | 37 | 1.2 | 28 | 2 |

The development of the plasticity of the composition 5.1 is very substantial. The raw stability, on the other hand, is very definitely improved with compositions 5.3 and 5.4 in accordance with the invention.

The stability of composition 5.2, which is not in accordance with the invention, is also very good. However, as previously indicated in connection with Table 14, its vulcanization system is not sufficiently reactive to confer upon the composition a rapid curing kinetics at 110° C.

Example 6

The purpose of this example is to show that the invention applies to compositions which have an elastomer other than natural rubber.

A base mixture is prepared having the following composition:

| | |
|---|---|
| SBR (*): | 100 |
| Carbon black: | 47 |
| Oil: | 15 |
| Zinc oxide: | 5 |
| Stearic acid: | 1 |
| Antioxidant (**): | 2 |

(*) SBR: styrene/butadiene copolymer comprising 25% of styrene units
(**) N-1,3-dimethyl-N-phenyl-paraphenylenediamine To this base mixture there are added insoluble sulfur, accelerators, and activators in accordance with Table 16. The insoluble sulfur used is the same as in Example 1. Three compositions are thus obtained, marked 6.1 to 6.3.

TABLE 16

| Composition | 6.1 | 6.2 | 6.3 |
|---|---|---|---|
| MBT | 0.6 | | |
| MBTS | | 1.1 | 0.32 |
| TBZTD | | 0.5 | |
| ZBEC | 1.35 | | 1.44 |
| DPG | | | 0.33 |
| BA-condensate | | 0.3 | |
| Insoluble sulfur | 3 | 2.75 | 3 |

Composition 6.1 contains no amine vulcanization activator; it is not in accordance with the invention. Compositions 6.2 and 6.3 are formulated with MBTS/TBZTD/BA condensate or MBTS/ZBEC/DPG combinations; they are in accordance with the invention.

Table 17 sets forth the rheometric characteristics at 110° C. of these compositions.

TABLE 17

| Composition | 6.1 | 6.2 | 6.3 |
|---|---|---|---|
| ts(0.2) (min) | 19.9 | 2.5 | 6.5 |
| t99 (min) | 82 | 30.3 | 30 |
| CRI (min$^{-1}$) | 1.61 | 3.6 | 4.2 |
| Maximum rheometric torque (dN.m) | 9.4 | 14.9 | 13.3 |

Composition 6.1 cures very slowly and reaches a low vulcanization yield.

Compositions 6.2 and 6.3 give rapid curing kinetics at 110° C. with a high vulcanization yield.

Table 18 shows the development of the Mooney plasticity at 100° C.

TABLE 18

| Composition | 6.1 | 6.2 | 6.3 |
|---|---|---|---|
| ML(1 + 4) init. | 58.5 | 60 | 57.3 |
| ML(1 + 4) after storage | 60.9 | 64 | 60 |
| Mooney delta | 2.4 | 4 | 2.7 |

The raw stability of the three compositions is excellent.

Example 7

The purpose of this example is to show the application of the invention to the recapping of a tire. The following composition is formulated:

| | |
|---|---|
| Natural rubber: | 100 |
| Carbon black: | 47 |
| Oil: | 15 |
| Zinc oxide: | 5 |
| Stearic acid: | 1 |
| Tackiness resin (*) | 3 |
| Antioxidant (**) | 2 |
| Insoluble sulfur (***) | 3 |
| MBT | 0.6 |
| ZBEC | 0.5 |
| DPG | 0.15 |

(*)Koresine (alkyl-phenol-acetylene resin)
(**)N-1,3-dimethyl-N-phenyl-paraphenylenediamine
(***)The insoluble sulfur used is that described in Example 1.

This composition in accordance with the invention is used as connecting rubber in the process of recapping by cold vulcanization, this process being known also as premolded tread recapping.

In this process, a truck tire of size 315/80 R 22.5, at the end of its first life, is decapped. The carcass is cleaned and brushed. A strip of a thickness of 1 mm of raw connecting rubber, produced with the preceding composition, is then applied to the carcass. Finally, the replacement tread, which has been precured and premolded, is placed onto the carcass which has been prepared in this manner.

The recapped tire is introduced into an oven at 110° C., pressurized at 5 bars for 2 hours.

At the end of this curing, the tread adheres as perfectly to the carcass as in the case of a new tire.

The preceding examples show that the invention makes it possible to obtain the following advantages simultaneously:
- non-carcinogenic compounds or compounds which are not precursors of carcinogenic products are used; they are therefore not regulated;
- a rapid curing at low temperatures of less than 140° C. with excellent vulcanization yield is obtained;
- the raw stability of the compositions during storage is excellent;
- this good raw stability makes it possible to store the components of the vulcanization system together; it furthermore makes it possible to have less constraining conditions of transportation and storage than in the case of the known compositions;
- due to the good raw stability, the compositions retain a substantial curing rate even after lengthy periods of storage;
- the compositions in accordance with the invention have multiple uses, and the user can employ them for various purposes and even, if desired, for the conventional vulcanizations at temperatures above 140° C., replacing other known compositions; the user is therefore not compelled to have different compositions, which simplifies his work.

The composition in accordance with the invention preferably has at least one of the following properties:
- it contains natural rubber or a mixture of natural rubber and at least one other rubber selected from the group consisting of polyisoprene, polybutadiene, styrene-butadiene copolymers, styrene-isoprene copolymers, butadiene-isoprene copolymers, and styrene-butadiene-isoprene terpolymers;
- it contains at least one additive selected from the group consisting of carbon blacks, extender oils, and tackiness agents;
- for 100 parts by weight of the rubber or all the rubbers, the amount of sulfur is between 0.5 and 5 parts by weight and advantageously between 1 and 3 parts by weight; the amount of compound b) or of all compounds b) is between 0.1 and 3 parts by weight and advantageously between 0.2 and 2 parts by weight, the amount of compound c) or of all compounds c) is between 0.2 and 3 parts by weight and advantageously between 0.4 and 2 parts by weight, the amount of compound d) or of all compounds d) is between 0.05 and 1 part by weight and advantageously between 0.1 and 0.5 parts by weight.

The process in accordance with the invention preferably consists of vulcanizing the composition in accordance with the invention at a temperature of between 95° C. and 115° C.

In Example 7 above, the process in accordance with the invention was employed to recap a worn tire, but the process of the invention can also be used to manufacture new tires, for instance to bond a precured tread onto a precured carcass, or to repair tires, for instance in order to plug holes, in particular in the sidewalls or in the tread or other parts of these tires. Furthermore, the invention can be used both to repair and to recap the same worn tire.

In these embodiments, the composition of the invention vulcanizes upon contact with rubbers which may be either completely prevulcanized or partially prevulcanized, the total vulcanization of these rubbers taking place then either upon the vulcanization of the composition in accordance with the invention or subsequently.

The nature of the rubbers in contact with which the composition in accordance with the invention vulcanizes in the aforesaid applications may be any whatsoever, and these rubbers, which vulcanize with sulfur or with other vulcanization systems may for instance, but not necessarily, be one or more rubbers selected from the group formed of natural rubber, polyisoprene, polybutadiene, the styrene-butadiene copolymers, styrene-isoprene copolymers, and butadiene-isoprene copolymers, and styrene-butadiene-isoprene terpolymers.

Of course, the invention is not limited to the embodiments indicated.

We claim:

1. A process for recapping a tire which comprises the steps of:

Applying between two prevulcanized parts of rubber, for connecting said parts, a rubber composition which is free of precursor of at least one carcinogenic nitrosamine, comprising at least one rubber selected from the group consisting of natural rubber, polyisoprene, polybutadiene, styrenebutadiene copolymer, styrene-isoprene copolymer and styrenebutadiene-isoprene terpolymer, and capable of vulcanizing in a cold vulcanization process at a temperature between about 95° C. to about 140° C., wherein the composition comprises, as vulcanization system (parts by weight for 100 parts of rubber):

between about 0.5 and about 5 parts of sulfur;

between about 0.1 and about 3 parts of at least one accelerator compound selected from the group consisting of benzothiazyl disulfide and mercaptobenzothiazole;

between about 0.2 and about 3 parts of at least one ultra-accelerator compound selected from the group consisting of tetrabenzylthiuram disulfide and zinc dibenzyldithiocarbamate; and between about 0.05 and about 1 part of at least one vulcanization amine activator selected from the group consisting of amines, guanidines, aldehyde and amine condensates, and quaternary ammonium salts; and Vulcanizing said parts at a temperature between about 95° C. and about 140° C.

2. The process of claim 1, wherein the amount of sulfur is between about 1 and about 3 pens.

3. The process of claim 1, wherein the amount of accelerator is between about 0.2 and about 2 parts.

4. The process of claim 1, wherein the amount of ultra-accelerator is between about 0.4 and about 2 parts.

5. The process of claim 1, wherein the amount of vulcanization amine activator is between about 0.1 and about 0.5 parts.

6. The process of claim 1, wherein the vulcanization amine activator is diphenylguanidine (DPG).

7. The process of claim 1, wherein the vulcanizing temperature is between about 95° C. and about 115° C.

8. A process for repairing a tire which comprises the steps of:

Applying between two prevulcanized parts of rubber, for connecting said parts, a rubber composition which is free of precursor of at least one carcinogenic nitrosamine, comprising at least one rubber selected from the group consisting of natural rubber, polyisoprene, polybutadiene, styrenebutadiene copolymer, styrene-isoprene copolymer and styrene-butadiene-isoprene terpolymer, and capable of vulcanizing in a cold vulcanization process at a temperature between about 95° C. to about 140° C., wherein the composition comprises, as vulcanization system (parts by weight for 100 parts of rubber):

between about 0.5 and about 5 parts of sulfur;

between about 0.1 and about 3 parts of at least one accelerator compound selected from the group consisting of benzothiazyl disulfide and mercaptobenzothiazole;

between about 0.2 and about 3 parts of at least one ultra-accelerator compound selected from the group consisting of tetrabenzylthiuram disulfide and zinc dibenzyldithiocarbamate; and between about 0.05 and about 1 part of at least one vulcanization amine activator selected from the group consisting of amines, guanidines, aldehyde and amine condensates, and quaternary ammonium salts; and Vulcanizing said parts at a temperature between about 95° C. and about 140° C.

9. The process of claim 8, wherein the amount of sulfur is between about 1 and about 3 parts.

10. The process of claim 8, wherein the amount of accelerator is between about 0.2 and about 2 parts.

11. The process of claim 8, wherein the amount of ultra-accelerator is between about 0.4 and about 2 parts.

12. The process of claim 8, wherein the amount of vulcanization amine activator is between about 0.1 and about 0.5 parts.

13. The process of claim 8, wherein the vulcanization amine activator is diphenylguanidine (DPG).

14. The process of claim 8, wherein the vulcanizing temperature is between about 95° C. and about 115° C.

* * * * *